(12) United States Patent
Parker et al.

(10) Patent No.: US 10,419,747 B2
(45) Date of Patent: Sep. 17, 2019

(54) SYSTEM AND METHODS FOR PERFORMING ELECTRONIC DISPLAY STABILIZATION VIA RETAINED LIGHTFIELD RENDERING

(71) Applicant: GOOGLE LLC, Mountain View, CA (US)

(72) Inventors: Evan Hardesty Parker, Los Altos, CA (US); Matthew Milton Pharr, San Francisco, CA (US); Johnny Chung Lee, Mountain View, CA (US); Craig Donner, Brisbane, CA (US); Daniel Erickson, Mountain View, CA (US); Dominik Philemon Kaeser, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 187 days.

(21) Appl. No.: 15/271,813

(22) Filed: Sep. 21, 2016

(65) Prior Publication Data

US 2017/0180721 A1    Jun. 22, 2017

Related U.S. Application Data

(60) Provisional application No. 62/271,225, filed on Dec. 22, 2015.

(51) Int. Cl.
*H04N 13/383*     (2018.01)
*H04N 13/344*     (2018.01)
(Continued)

(52) U.S. Cl.
CPC ......... *H04N 13/383* (2018.05); *G02B 27/017* (2013.01); *G06F 3/012* (2013.01);
(Continued)

(58) Field of Classification Search
CPC .. H04N 13/383; H04N 13/344; H04N 13/341; H04N 13/398; G02B 27/017;
(Continued)

(56) References Cited

U.S. PATENT DOCUMENTS 6,009,188 A * 12/1999 Cohen .................. G06T 15/50
                                                            345/419
6,023,523 A    2/2000   Cohen et al.
(Continued)

OTHER PUBLICATIONS

Gortler et al. ("The Lumigraph", Proceedings of the 23rd annual conference on Computer Graphics and Interactive Techniques (SIGGRAPH), pp. 43-54, 1996.) (Year: 1996).*
(Continued)

*Primary Examiner* — Maria E Vazquez Colon

(57) ABSTRACT

In a system having a user-portable display device, a method includes maintaining a lightfield data structure representing at least a portion of a four-dimensional (4D) lightfield for a three-dimensional (3D) world in association with a first pose of the user-portable display device relative to the 3D world. The method further includes determining a second pose of the user-portable display device relative to the 3D world, the second pose comprising an updated pose of the user-portable display device. The method additionally includes generating a display frame from the lightfield data structure based on the second pose, the display frame representing a field of view of the 3D world from the second pose.

12 Claims, 7 Drawing Sheets

(51) Int. Cl.
*H04N 13/341* (2018.01)
*H04N 13/398* (2018.01)
*G06F 3/01* (2006.01)
*G06F 3/0481* (2013.01)
*G02B 27/01* (2006.01)

(52) U.S. Cl.
CPC .......... *G06F 3/013* (2013.01); *G06F 3/04815* (2013.01); *H04N 13/341* (2018.05); *H04N 13/344* (2018.05); *H04N 13/398* (2018.05); *G02B 2027/014* (2013.01); *G02B 2027/0187* (2013.01); *G02B 2027/0198* (2013.01)

(58) Field of Classification Search
CPC .... G02B 2027/0187; G02B 2027/0198; G02B 2027/014; G06F 3/012; G06F 3/013; G06F 3/04815
See application file for complete search history.

(56) References Cited

U.S. PATENT DOCUMENTS

| | | | |
|---|---|---|---|
| 6,097,394 | A | 8/2000 | Levoy et al. |
| 8,044,994 | B2 | 10/2011 | Vetro et al. |
| 8,643,684 | B2 | 2/2014 | Ranieri et al. |
| 9,767,373 | B2 * | 9/2017 | Yang .................. G06K 9/00335 |
| 2013/0285885 | A1 | 10/2013 | Nowatzyk et al. |
| 2014/0354515 | A1 | 12/2014 | Lavalle et al. |
| 2015/0029218 | A1 * | 1/2015 | Williams .............. G06T 19/006 345/633 |
| 2015/0205126 | A1 * | 7/2015 | Schowengerdt ........ G06T 13/40 345/633 |
| 2015/0301592 | A1 | 10/2015 | Miller |
| 2017/0032569 | A1 * | 2/2017 | Rondao Alface ....... G06T 17/00 |

OTHER PUBLICATIONS

Gortler et al. ("The Luminograph", Proceedings of the 23rd annual conference on Computer Graphics and Interactive Techniques (SIGGRAPH), pp. 43-54, 1996.) (Year: 1996).*
International Preliminary Report on Patentatbility for PCT Application No. PCT/US2016/052859, 9 pages.
S. J. Gortler, R. Grzeszczuk, R. Szeliski, M. F. Cohen, "The Lumigraph", Proceedings of the ACM Computer Graphics (SIGGRAPH), Aug. 1, 1996, 10 pages.
M. Levoy, P. Hanrahan, "Light Field Rendering", Proceedings of the 23rd Annual Conference on Computer Graphics and Interactive Techniques (SIGGRAPH), Aug. 1996, 12 pages.
L. McMillan, G. Bishop, "Plenoptic Modeling: An Image-Based Rendering System", Proceedings of the 22nd Annual Conference on Computer Graphics and Interactive Techniques (SIGGRAPH), Aug. 6-11, 1995, 8 pages.
Written Opinion of the International Preliminary Examining Authority dated Nov. 28, 2017 for PCT Application No. PCT/US20165/052859, 7 pages.
International Search Report and Written Opinion for PCT Patent Application No. PCT/US2016/052859 dated Jan. 9, 2017, 13 pages.
Shi, F., et al., "On the Use of Ray-tracing for Viewpoint Interpolation in Panoramic Imagery", Canadian Conference on Computer and Robot Vision, (2009), pp. 200-207.
European Examination Report dated Mar. 28, 2019 for corresponding EP Application No. 16 788 830.4, 8 pages.

* cited by examiner

SYSTEM AND METHODS FOR PERFORMING ELECTRONIC DISPLAY STABILIZATION VIA RETAINED LIGHTFIELD RENDERING

FIELD OF THE DISCLOSURE

The present disclosure relates generally to rendered display systems and more particularly to reduced-latency motion compensation and stabilization in user-portable display systems.

BACKGROUND

A virtual reality (VR) system replicates an environment that simulates physical presence in places in the real world or an imagined world using entirely-computer-generated three-dimensional (3D) imagery of "scenes" within this world. Similarly, an augmented reality (AR) system "augments" physical presence in the real world through computer-generated 3D imagery that overlies contemporaneously captured imagery of the real world. Thus, VR and AR systems both seek to provide an accurate sense of "presence" in the real, augmented, or imagined world. Typically, this sense of presence is facilitated through the use of a head mounted display (HMD), tablet, smartphone, or other user-portable display device that displays imagery that provides a two dimensional (2D) or 3D representation of a scene in the represented world, where the presented scene reflects the user's relative perspective of the scene based on the user's current pose (that is, the location and orientation of the user-portable display device relative to a reference coordinate frame for the depicted scene).

User-portable display devices display this imagery as a sequence of display frames, each display frame rendered based on a corresponding detected pose of the device and persisting for a particular period of time. However, as the display device is user-portable, a user typically is able to move freely about and thus the pose of the display device may significantly change between display frames. As such, the imagery displayed at the display device at a particular point in time may lag behind the user's movements. This dissonance between the user's perceived orientation within a scene and the orientation of the perspective of the scene presented on the display device can lead to user disorientation, or what is often referred to as "virtual reality sickness", particularly in the context of HMDs and other 3D display devices. Thus, to reduce or eliminate user disorientation and thereby provide improved presence, VR and AR systems seek to minimize the "motion-to-photon latency"; that is, the latency between a user's movement and when photons representing a scene from in the resulting new pose hit the user's eye.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

FIGS. 1-7 illustrate example systems and methods for an electronic display stabilization (EDS) process that provides low-latency display of a rendered 3D world at a user-portable display device based on a current pose of the user-portable display device. A graphical application executed by a processing system renders "lightfield" frames composed of one or more viewports, each viewport corresponding to a virtual camera observing the 3D world. These viewports represent samples from the 5D plenoptic function or the 4D lightfield of the 3D world and include color information, and may include depth information as well. The processing system may chose the number and pose of each virtual camera based on a probability distribution of predicted poses over some specified future time span. At a subsequent point in time, the processing system obtains the latest pose of the user-portable display device and generates "display" frames composed of one or more viewports that suitably approximate the 5D plenoptic function or 4D lightfield as viewed from this latest pose by interpolating/extrapolating from the viewports represented by the lightfield frames. The generated display frames then may be displayed at the user-portable display device with suitable predistortion warping or other optical display calibration. As the pose of the user-portable display system changes, the processing system may continue to render new display frames at a consistent and relatively high frame rate with low motion-to-photon latency, even in the event that the system has not rendered any new lightfield frames in some time. Thus, even when the system is unable to render lightfield frames fast enough, the processing system can continue to provide low-latency display frames that accurately represent the current pose of the user-portable display device so long as this pose is sufficiently close to the poses of the virtual cameras that were used by the processing system for the most recently rendered lightfield frames.

Figure 1:
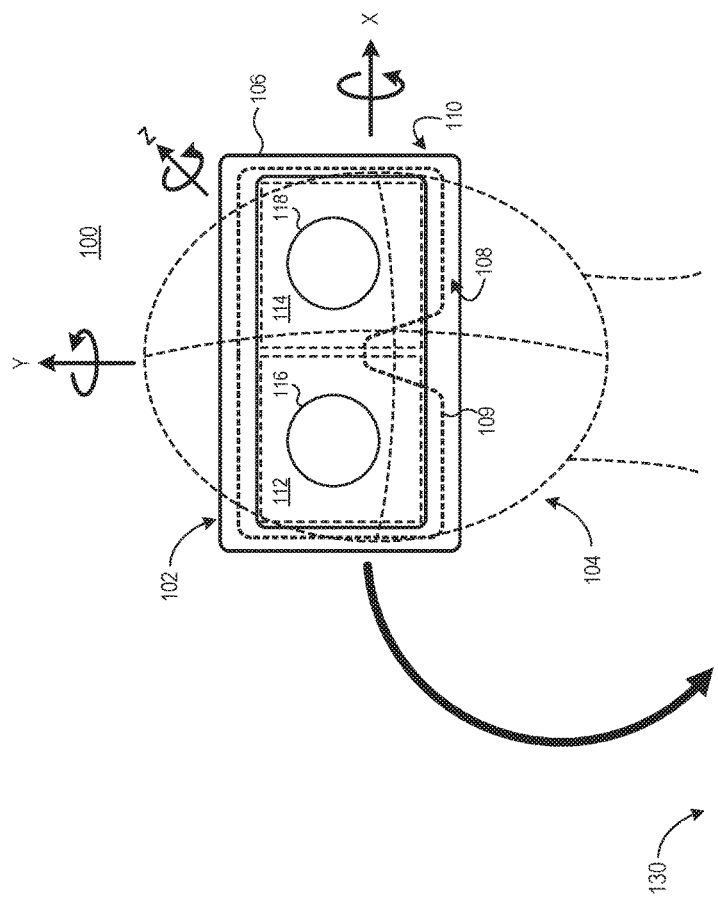
FIG. 1 is a diagram illustrating a user-portable display system implementing a retained-lightfield-based electronic display stabilization (EDS) process in accordance with at least one embodiment of the present disclosure.
Figure 1:
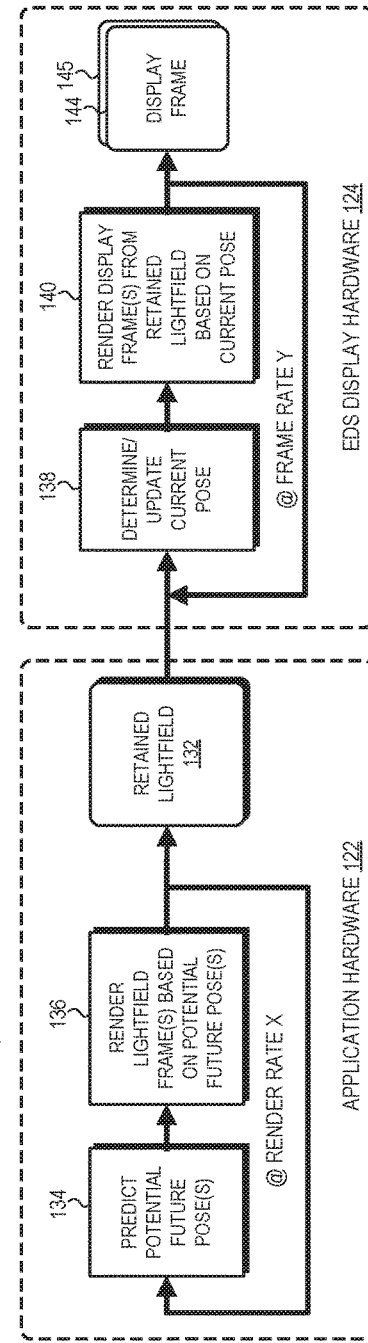

FIG. 1 illustrates a display system 100 for providing VR or AR presence in the real world or an imagined world in accordance with at least one embodiment of the present disclosure. The display system 100 includes a user-portable display device 102 for displaying imagery of a 3D world that may comprise a VR scene or AR scene. For ease of illustration, the user-portable display device 102 is described in the example context of a head mounted display (HMD), and thus the user-portable display device 102 also is referred to herein as "HMD 102." However, in other embodiments, the user-portable display device 102 may comprise any of a variety of electronic devices that are user-portable and which facilitate display of stereoscopic or other 3D imagery, such as, for example, a tablet computer, a notebook computer, a smartphone, and the like.

The HMD 102 typically is coupled to the movements of a user's head 104 in some manner. Typically, as implied by the term "mounted" in "head mounted display" the HMD 102 includes an apparatus strapped to, or otherwise mounted on, the user's head 104 such that the HMD 102 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head 104 moves. In such instances, a hand-held device operated in this manner also may be considered an implementation of the HMD 102 even though it is not "mounted" via a physical attachment to the user's head 104.

The HMD 102 comprises a housing 106 having a surface 108 opposite another surface 110, as well as a face gasket 109 and set of straps or a harness (omitted from FIG. 1 for clarity) to mount the housing 106 on the user's head 104 so that the user faces the surface 108 of the housing 106. In the depicted embodiment, the HMD 102 is a binocular HMD and thus has a left-eye display 112 and a right-eye display 114 disposed at the surface 108. The displays 112, 114 may be implemented as separate display devices (that is independent display arrays driven by separate display driver hardware components) or the displays 112, 114 may be implemented as logically-separated regions of a single display device (e.g., a single display array logically divided into left and right "halves"). The housing 106 further includes an eyepiece lens 116 aligned with the left-eye display 112 and an eyepiece lens 118 aligned with the right-eye display 114. Alternatively, in some embodiments, the HMD 102 may be implemented as a monocular HMD in that a single image is presented to both eyes of the user, either through left and right eyepiece lenses 116, 118, or directly without an intervening lens.

As described in greater detail below, the display system 100 further includes a processing system to generate imagery for display at the HMD 102. In some embodiments, the components of the processing system are primarily implemented within the HMD 102 itself. For example, the HMD 102 may comprise a computing system that executes a VR/AR application and renders the resulting imagery, and the HMD 102 may be connected through a wireless or wired connection to a local or remote computing device that provides various data associated with the VR/AR application, such data describing objects to be rendered in a scene, the parameters of other users (e.g., location) operating in the same world space, and the like. In other embodiments, some or all of the components of the image rendering system are implemented external to the HMD 102, and the data representing the imagery for display may be supplied to the HMD 102 via a wired or wireless connection.

In operation, the display system 100 executes a VR or AR software application that determines the current pose (that is, position and rotational orientation) of the HMD 102 (and thus the user's head 104) relative to a reference coordinate frame of a represented 3D world and then generates imagery of a scene from a perspective associated with that pose. The displayed imagery may be completely computer-generated (that is, VR imagery), or the imagery may be a combination of imagery captured of the local environment (e.g., imagery captured via one or more image sensors mounted on the HMD 102) and an AR overlay that is rendered so as to reflect the current user pose. As shown in FIG. 1, in implementations with both a left-side display and a right-side display, left-eye-specific imagery may be rendered and displayed in the left-eye display 112 concurrent with the rendering and display of right-eye-specific imagery in the right-eye display 114, thereby enabling a stereoscopic 3D display of scene represented by the displayed imagery.

As the HMD 102 is mounted on the user's head 104, or otherwise constrained so as to move in concert with the user's head, the HMD 102 is subject to considerable movement during operation. As described above, this movement, when combined with the rendering and display latency of the display system 100, can result in substantial user disorientation unless otherwise mitigated. To this end, the display system 100 utilizes a process to reduce motion-to-photon latency by pre-rendering lightfield frames from predicted potential future poses of the display device 102, incorporating these lightfield frames into a lightfield data structure representing at least a portion of the lightfield of a 3D world (referred to herein as a "retained lightfield"), and then using this lightfield data structure to generate display frames representing a 3D scene from detected poses of the display device. This process is referred to herein as the "electronic display stabilization (EDS) process."

In at least one embodiment, the EDS process is based on at least partial decoupling of the application processor and other hardware used to render the lightfield frames and otherwise maintain the lightfield data structure (referred to herein as "application hardware 122") and the hardware used to render display frames from the lightfield data structure (referred to herein as the "EDS hardware 124"). Through this decoupling the retained lightfield rendering process can be performed at one rate and the display frame rendering process may be performed at a second, typically faster, rate, and thus dropped frames or other temporary impacts to the lightfield rendering process can be prevented from propagating to the display frame rendering process. Moreover, by predicting potential future poses, rendering lightfield frames for those predicted future poses, and then subsequently rendering display frames for one or more actual poses based on interpolation from the rendered lightfield frames for one or more actual future poses, the display system can more rapidly render display frames for the current pose of the display device compared to systems that operate to render the display frames from scratch upon determining the current pose, and thus reduce the motion-to-photon latency compared to these conventional techniques.

Diagram 130 of FIG. 1 summarizes the EDS process employed by the application hardware 122 and EDS hardware 124 in accordance with at least one embodiment. The application hardware 122 continually updates a retained lightfield 132 stored as a lightfield data structure by repeatedly performing a process of identifying a likely range of poses of the HMD 102 in a given future time span and from this range of poses selecting one or more potential future poses (block 134). For each selected potential pose, the application hardware 122 renders a lightfield frame representing a viewport of the 3D world on the basis of the potential pose being the pose of a corresponding virtual camera, and the retained lightfield 132 is updated by incorporating this rendered lightfield frame into the retained lightfield 132 (block 136). For the HMD 102 and other stereoscopic-based display device, this process may be performed in parallel on the basis of the orientations of the eyes of the user. This update process may be performed at a rate "X", whereby X represents the frequency at which the retained lightfield 132 is updated by incorporating a newly-rendered lightfield frame.

Independently, the EDS hardware 124 operates to iteratively identify an updated current pose of the HMD 102 (block 138) and, for that updated current pose, generate a pair of display frames 144, 145 for display at the displays 112, 114 from the retained lightfield 132 (block 140). Each of the display frames 144, 145 represents a viewport of the 3D world for a virtual camera positioned in the current pose (including adjustment for the pose of the left eye/right eye). As noted above, generating and updating the retained lightfield 132 comprises inserting each 2D slice represented by a corresponding lightfield frame into the retained lightfield 132, and generating a display frame from the retained lightfield 132 thus is achieved by extracting/resampling a 2D slice from the retained lightfield 132, the 2D slice corresponding to the viewport as viewed from a virtual camera at the current pose (including adjustment for the pose of the left eye/right eye). Generally, this process of generating the viewport/display frame from a lightfield, such as the retained lightfield 132, is based on well-known processes for ray tracing-based interpolation/extrapolation between one or more lightfield frames, however, any of a variety of viewport rendering processes may be utilized in accordance with the present disclosure. As depicted, the EDS hardware 124 performs the pose determination and display frame rendering process of blocks 138 and 140 at a frame rate Y, where Y may be greater than, less than, or equal to the rate X discussed above.

Figure 2:
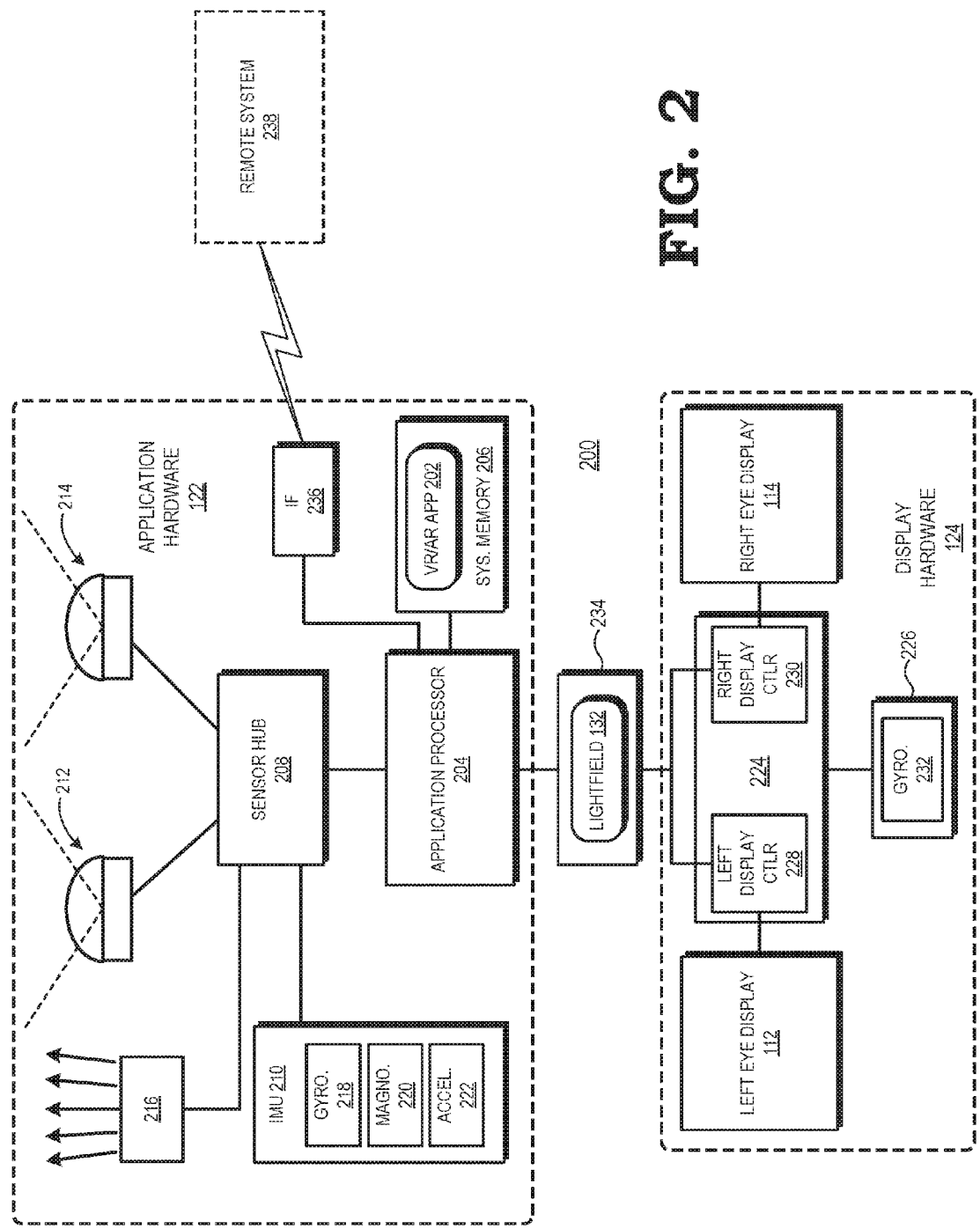
FIG. 2 is a block diagram illustrating a processing system of the display system of FIG. 1 in accordance with at least one embodiment of the present disclosure.

FIG. 2 illustrates an example processing system 200 of the HMD 102 of the display system 100 of FIG. 1 in accordance with at least one embodiment of the present disclosure. As noted above, the processing system 200 includes application hardware 122 directed to the execution of a VR or AR application (referred to herein as "VR/AR application 202") so as to render a retained lightfield 132 representing VR or AR content from predicted potential poses in a 3D world. The processing system 200 further includes the EDS hardware 124 directed to the display of the VR or AR content represented by a sequence of display frames generated from the retained lightfield 132 on the basis of the current pose of the HMD 102.

In the depicted example, the processing system 200 includes an application processor 204, a system memory 206, a sensor hub 208, and an inertial management unit 210. In some embodiments, the HMD 102 may incorporate image capture for purposes of visual localization or visual telemetry, or for real-time display of imagery captured of the local environment in support of AR functionality. In such embodiments, the processing system 200 further may include, for example, one or more image sensors 212, 214 and a structured-light or time-of-flight (ToF) depth sensor 216.

The IMU 210 comprises one or more inertial sensors to facilitate tracking of the latest pose of the HMD 102, including, for example, a gyroscope 218, a magnetometer 220, and an accelerometer 222. The Sensortec™ BMI160 from Bosch Gmbh is an example of a commercially-available implementation of the IMU 210. The sensor hub 208 is coupled to the IMU 210, the imaging sensors 212, 214, and the depth sensor 216, and operates to manage the transfer of control signaling and data between the application processor 204 and the IMU 210, the imaging sensors 212, 214, the depth sensor 216, and other sensors of the display system 100. The Myriad™ 2 vision processing unit (VPU) from Movidius Ltd. is an example of a commercially-available implementation of the sensor hub 208. The application processor 204 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of the application processor 204.

In the depicted example, the EDS hardware 124 includes a compositor 224, the left-eye display 112, and the right-eye display 114. The EDS hardware 124 may be communicatively coupled to the IMU 210 to receive sensor output from the IMU 210, or the EDS hardware 124 may include a separate IMU 226 for its own use in pose estimation, with the IMU 226 having one or more inertial sensors, such as a gyroscope 232. The compositor 224 is a hardware device that may be implemented as, for example, an ASIC, programmable logic, or a combination thereof, and includes a left display controller 228 for driving the left-eye display 112 and a right display controller 230 for driving the right-eye display 114.

In operation, the application processor 204 executes the VR/AR application 202 (stored in, for example, the system memory 206) to provide VR/AR functionality for a user. As part of this process, the VR/AR application 202 manipulates the application processor 204 to determine the current pose of the HMD 102 and from this current pose select one or more potential poses of the HMD 102 for a given span of time. As described in greater detail below, in at least one embodiment the VR/AR application 202 operates to determine a probability distribution of potential poses for the HMD 102, and uses this probability distribution to select one or more potential future poses. In some embodiments, to determine the current pose the application processor 204 obtains the current samples from the gyroscope 218, the magnetometer 220, and the accelerometer 222 of the IMU 210 and determines the current pose and rotation of the user's head from these inertial sensor readings. Instead of, or in addition to, using the IMU 210 for determining the current pose and rotation, the application processor 204 may use the information from one or more imaging sensors 212, 214 or depth sensors 216 to determine, verify, or revise the current pose and rotation using one or more visual telemetry or simultaneous localization and mapping (SLAM) techniques. The VR/AR application 202 further may manipulate the application processor 204 to render lightfield frames representing viewports of virtual cameras positioned at corresponding ones of the selected potential poses, and incorporate these rendered lightfield frames into the retained lightfield 132, which in the embodiment of FIG. 2 is implemented as a data structure stored in a lightfield storage component 234. The lightfield storage component 234 may comprise, for example, a portion of system memory 206 or a separate memory, a disc drive, a solid state drive, and the like.

Alternatively, in some embodiments at least a portion of the lightfield rendering process is offloaded to a remote system, rather than being performed at the HMD 102 itself. For example, in some embodiments, the processing system 200 may include an interface 236 coupled to a remote system 238, whereby the remote system 238 may be a computing system in the same room or local area as the HMD 102 and coupled to the HMD 102 via a wired or wireless local area connection (LAN) or personal area connection (PAN), or may be a remote server connected to the HMD 102 via one or more wired or wireless networks, such as the Internet. In such instances, the VR/AR application 202 may provide the remote system 238 with a representation of the current pose, whereupon the remote system 238 determines the potential poses and renders the lightfield frames for each of the selected poses and then transmits the lightfield frames to the HMD 102 for incorporation in the retained lightfield 132. Alternatively, the VR/AR application 202 may manipulate the application processor 204 to determine the potential poses, and these potential poses are then transmitted to the remote system 238 for use in rendering the lightfield frames.

In parallel to iterations of the lightfield frame rendering process, the compositor 224 operates to generate display frames and drive the displays 112, 114 based on the generated display frames. As part of this process, the compositor 224 determines the current pose of the HMD 102 and then generates a pair of display frames, one for each of the left-eye display 112 and the right-eye display 114, from the retained lightfield 132 based on the determined current pose. The current pose of the HMD 102 may be determined form the IMU 210, the IMU 226, from visual telemetry, and the like. In some embodiments, the HMD 102 further may include one or more imaging sensors focused on the user's eyes or another mechanism to track the current positions of the user's eyes, and from this incorporate the left eye pose and right eye pose into the "current pose" of the HMD 102. In such instances, the current pose of the HMD 102 may include separate "sub-poses" for each eye, with the display frame for the left-eye display 112 generated from the retained lightfield 132 on the basis of a virtual camera with the sub-pose for the left eye, and the display frame for the right-eye display 114 similarly generated on the basis of a virtual camera with the sub-pose for the right eye.

Figure 3:
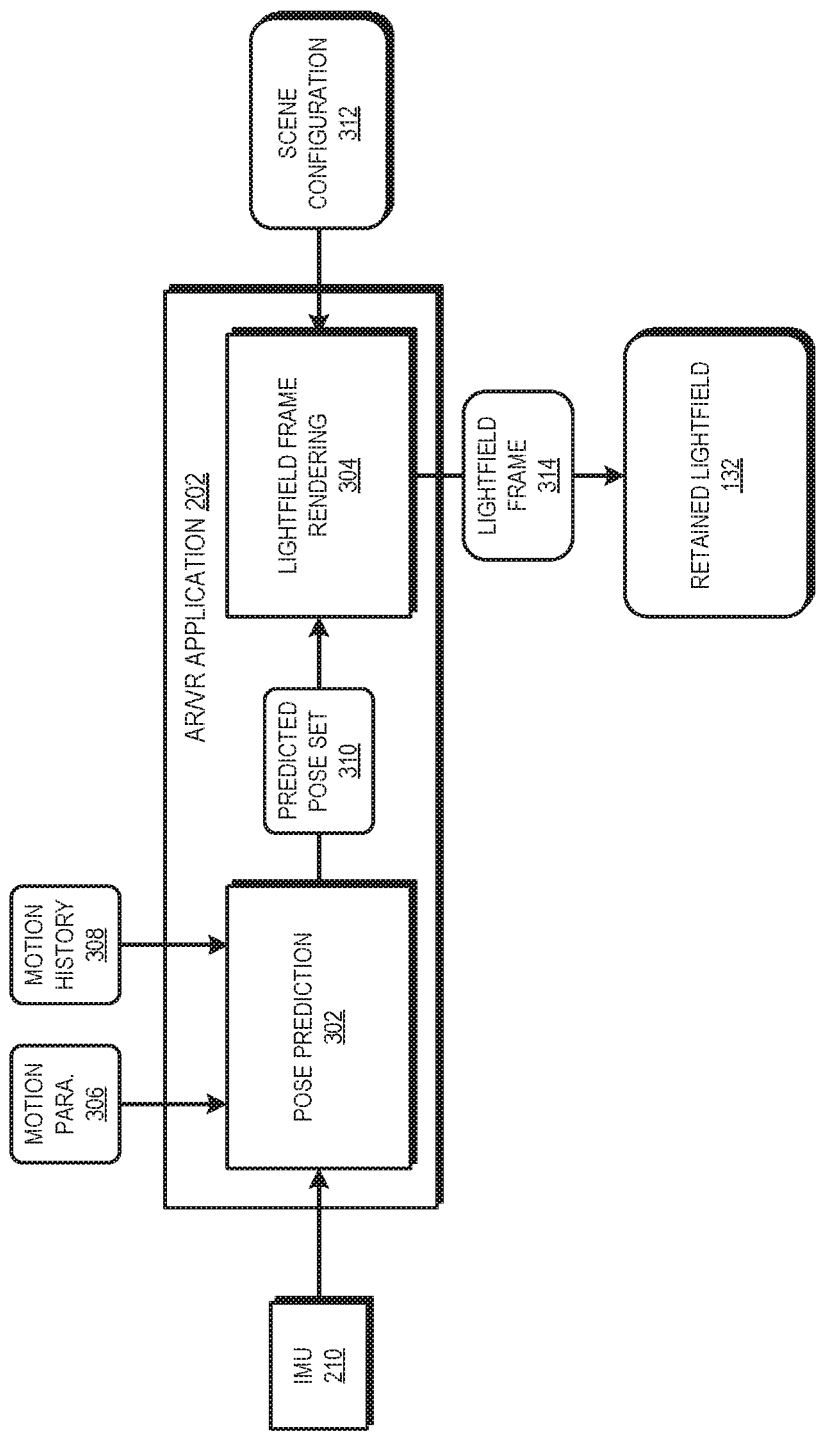
FIG. 3 is a block diagram illustrating an example implementation of a software application executed by at least one processor of the display system of FIG. 2 in accordance with at least one embodiment of the present disclosure.
Figure 4:
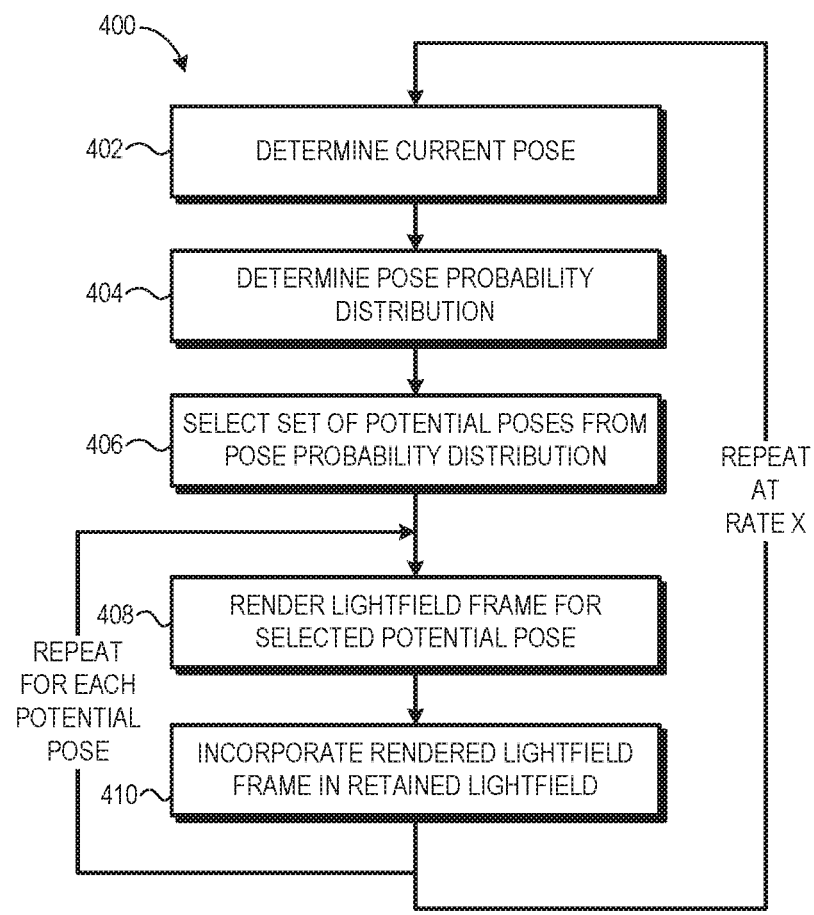
FIG. 4 is a flow diagram illustrating a process for generating and maintaining a retained lightfield data structure using the software application of FIG. 3 in accordance with at least one embodiment of the present disclosure.

FIGS. 3 and 4 together illustrate an example implementation of the VR/AR application 202 executed by the application processor 204 and an example method of its operation. In the implementation depicted in FIG. 3, the VR/AR application 202 includes a pose prediction module 302 and a lightfield frame rendering module 304. The pose prediction module 302 includes inputs to receive one or more of sensor output from the IMU 210, motion parameter information 306, and motion history information 308. The motion parameter information 306 includes parameters representing anticipated movements of the HMD 102, such as parameters representing the maximum anticipated rotational velocities or linear velocities of the HMD 102. These parameters may be pre-set or otherwise programmed, or may be updated or refined based on observations of prior movements of the HMD 102. The motion history information 308 represents previous poses of the HMD 102. The lightfield frame rendering module 304 includes an input coupled to an output of the pose prediction module 302 to receive a set 310 of predicted poses of the HMD 102 for a given time span, an input coupled to receive scene configuration information 312, and an output to provide lightfield frames 314 for incorporation into the retained lightfield 132. The scene configuration information 312 comprises data and other information representing the geometries, textures, and other visual parameters of objects in the current AR or VR world space which is being visually represented through the HMD 102.

Referring now to the method 400 depicted in FIG. 4, an example operation of the implementation of the VR/AR application 202 of FIG. 3 is described. A repetition of method 400 initiates at block 402, whereby the pose prediction module 302 determines the current pose of the HMD 102 based on sensor output from the IMU 210, via visual telemetry information, or a combination thereof. In at least one embodiment, the current pose represents a six degree of freedom (6DoF) pose. As noted above, the current pose may include "sub-poses" for each of the left and right eyes of the user, and thus the pose prediction module 302 may determine a general pose representative of overall pose of the HMD 102, and from the geometry of the HMD 102 and the user's head, adjust the position component of the pose for each of each of the left and right eyes. Further, in some embodiments the HMD 102 may employ an eye tracking mechanism to track the orientation of the eyes, and from this also adjust the orientation component of the pose for each eye.

At block 404, the pose prediction module 302 determines a range of potential poses of the HMD 102 for a specified future time span (e.g., the duration between display frames at the frame rate of the HMD 102). To illustrate, the pose prediction module 302 may utilize the motion parameter information 306 to determine the maximum changes in position and orientation from the current pose for the time span, and thus define as potential poses any pose having a delta from the current pose that is within these maximums. As another example, the pose prediction module 302 may utilize the motion history information 308 to predict changes in position and orientation based on prior behavior of the HMD 102. In particular, in at least one embodiment the pose prediction module 302 may determine the potential poses of the HMD 102 as a probability distribution of predicted poses using one or a combination of the motion parameter information 306 and the motion history information 308. For ease of reference, the method 400 is described in the example context of the use of a probability distribution of predicted poses.

At block 406, the pose prediction module 302 selects a set of potential poses (that is, set 310) from the probability distribution. The number selected for inclusion in set 310 may be a fixed number, or may be dynamically set based on current operational conditions, such as loading of the application processor 204, the complexity of the 3D scene to be rendered, a confidence level specified for the probability distribution, the degree of distribution within the probability distribution, and the like. For example, in some embodiments the pose prediction module 302 may utilize heuristics, such as current velocity and acceleration, and predicting forward in time for the probability distribution. Moreover, parameters representing a typical range of human head velocity/acceleration may be utilized in determining this distribution. As for sampling or otherwise selecting the particular set of potential poses, any of a variety of techniques may be employed, such as simply choosing the mean (a single sample, or two samples, one for each eye), three samples, with one located between the two eyes and two placed left and right slightly outside of the eyes, randomly selecting N samples weighted with the probability, uniform sampling in the spatial domain with a volume that encompasses some or all of the probability distribution, and the like.

The pose prediction module 302 provides the selected set 310 of potential poses to the lightfield frame rendering module 304. In response, at block 408 the lightfield frame rendering module 304 selects a potential pose from the set of potential poses and renders a lightfield frame 314 that represents a corresponding viewport of the 3D world for a virtual camera having the selected potential pose using any of a variety of well-known rendering techniques. At block 410, the lightfield frame rendering module 304 incorporates the lightfield frame 314 into the retained lightfield 132. This incorporation process can include, for example, storing the color information, and optionally depth information, of the lightfield frame 314 in a corresponding entry or element of the data structure representing the retained lightfield 132, as well as storing a representation of the pose represented by the lightfield frame 314 in an index, vector, or other searchable/indexed field associated with the entry or element. The process of blocks 408 and 410 is repeated for each potential position of the set 310. Upon completion of the processing for the set 310 of potential poses, the flow of method 400 returns to block 402 and another repetition of the method 400 is performed.

Figure 5:
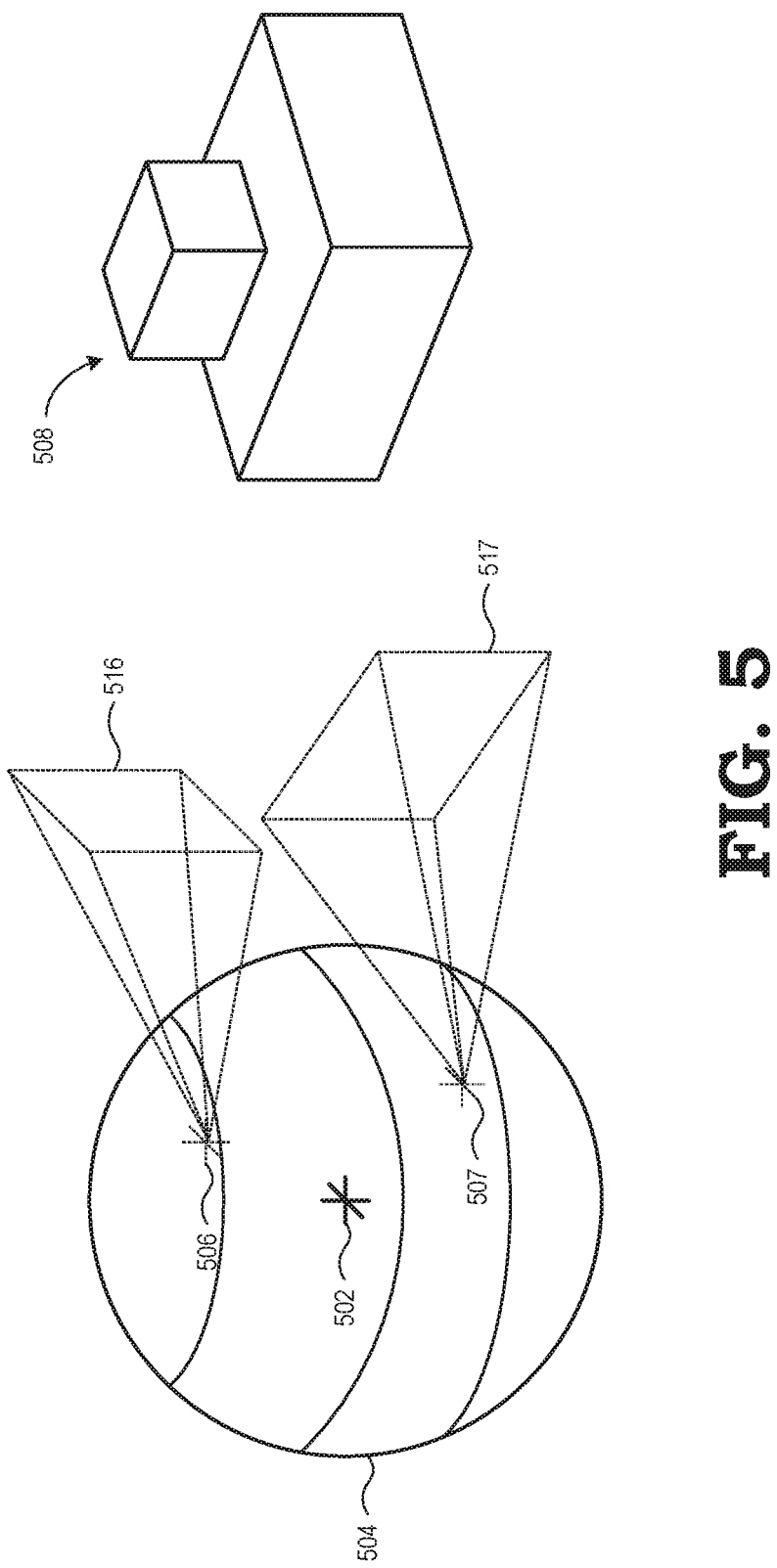
FIG. 5 is a diagram illustrating an example representation of a pose probability distribution and a generation of viewports of a 3D world generated therefrom in accordance with at least one embodiment of the present disclosure.

FIG. 5 depicts a graphical illustration of the potential pose selection and lightfield frame rendering process of FIG. 4. In the depicted example, the pose prediction module 302 has predicted a probability distribution of potential poses from a current pose 502 of the HMD 102. For ease of illustration, this probability distribution is depicted as a simplified three-dimensional spherical volume 504 centered on the position component of the current pose 502. From this probability distribution, the lightfield frame rendering module 304 has selected a set 310 of two potential poses 506, 507. For potential pose 506, the lightfield frame rendering module 304 renders a lightfield frame 314 that represents a viewport 516 of a 3D world 508 in the field of view of a virtual camera having the potential pose 506. Likewise, for potential pose 507, the lightfield frame rendering module 304 renders a lightfield frame 314 that represents a viewport 517 of the 3D world 508 in the field of view of a virtual camera having the potential pose 507. These lightfield frames then may be integrated into the retained lightfield 132 as described above.

Figure 6:
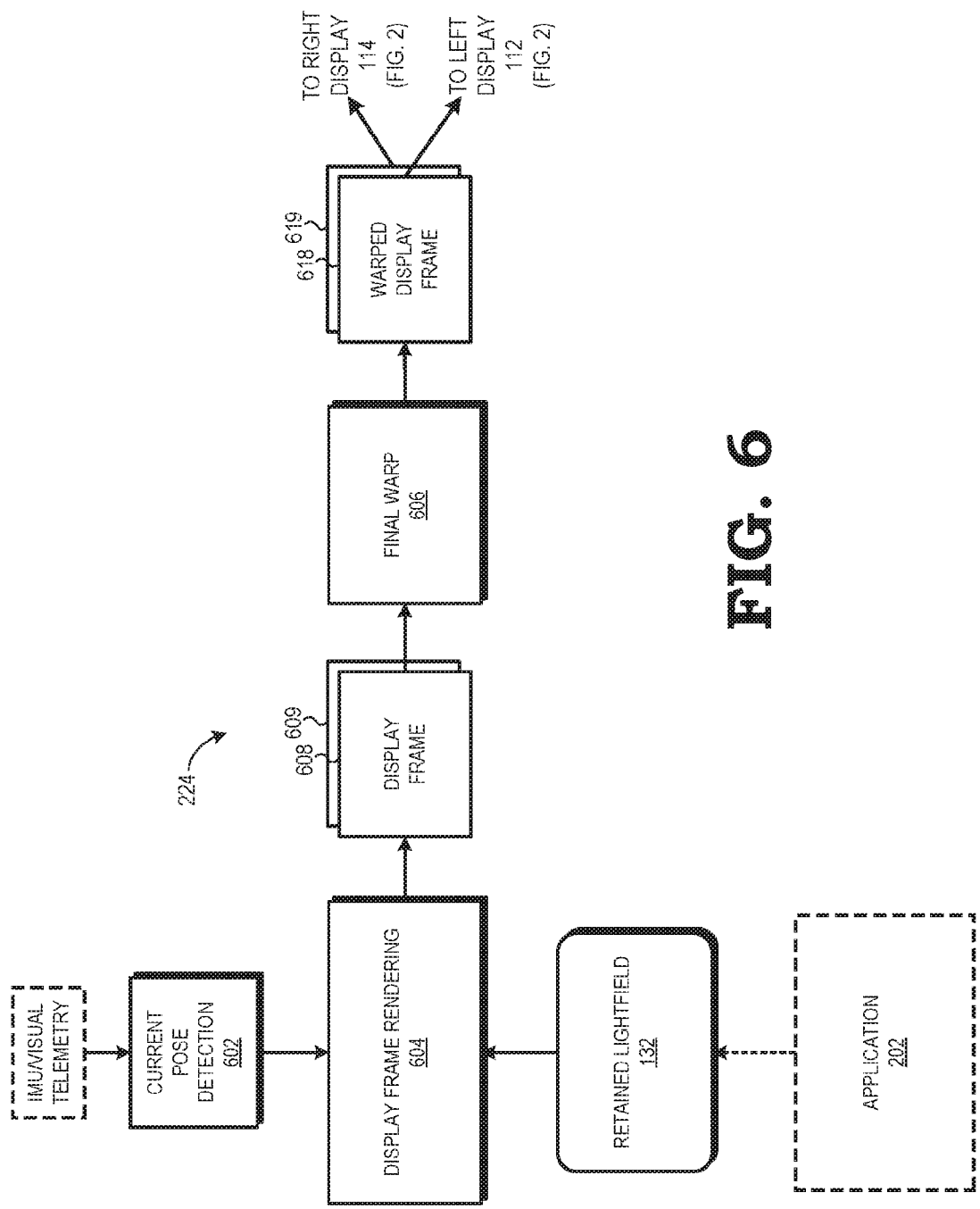
FIG. 6 is a block diagram illustrating an example implementation of a compositor of the display system of FIG. 2 in accordance with at least one embodiment of the present disclosure.
Figure 7:
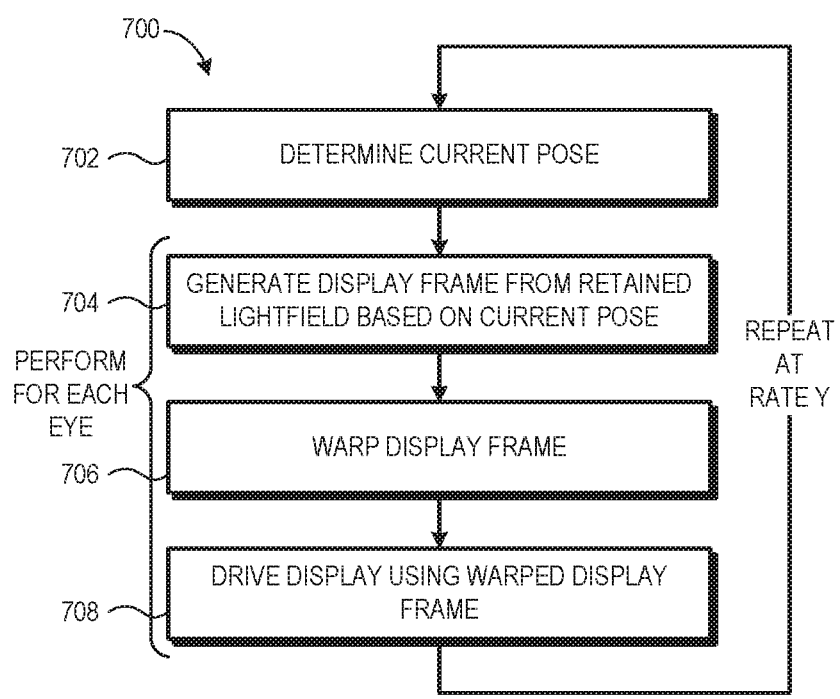
FIG. 7 is a flow diagram illustrating an EDS process for generating display frames based on a current pose of a user-portable display system and based on a lightfield data structure in accordance with at least one embodiment of the present disclosure.

FIGS. 6 and 7 together illustrate an example implementation of the compositor 224 of the EDS hardware 124 and an example method of its operation. In the implementation depicted in FIG. 6, the compositor 224 includes a current pose detection component 602, a display frame rendering component 604, and a final warp component 606. The current pose detection component 602 is operable to determine an updated current pose of the HMD 102 (which may include separate sub-poses for each eye) using, for example, one or both of the IMUs 210, 226, via visual telemetry information, or a combination thereof. The display frame rendering component 604 is operable to generate one or a pair of display frames, such as display frames 608, 609 from the retained lightfield 132 based on the current pose provided by the current pose detection component 602. The final warp component 606 is operable to provide any final warping or other optical calibration processing of the display frames 608, 609 to generate warped display frames 618, 619, respectively, for output to the left-eye display 112 and the right-eye display 114, respectively.

Referring now to the method 700 depicted in FIG. 7, an example operation of the implementation of the compositor 224 of FIG. 6 is described. Repetitions of the method 700 operate in parallel with repetitions of the method 400 of FIG. 4. A repetition of method 700 initiates at block 702, whereby the current pose detection component 602 determines a current pose of the HMD 102 based on sensor output from an IMU, visual telemetry, or a combination thereof. The current pose may include sub-poses for each eye of the user. At block 702, the display frame rendering component 604 uses the current pose determined at block 702 to generate a display frame for each eye from the retained lightfield 132.

In at least one embodiment, the generation of the display frame comprises extracting a 2D slice from the 4D lightfield represented by the retained lightfield 132, with the 2D slice representing a viewport of the 3D world as observed by a virtual camera having the pose detected at block 702. In some embodiments, this 2D slice extraction process comprises a ray-tracing based techniques whereby the viewport is compiled from matching rays from lightfield frames stored in the retained lightfield 132, as well as interpolation of rays from these lightfield frames. However, while this is one possible approach, any of a variety of well-known techniques for generating an image from a lightfield for a given pose may be utilized.

At block 706, the final warp component 606 may apply one or more warp processes to prepare the display frames generated at block 704. In some embodiments, these warp processes may include pre-distorting the display frame to compensate for spatial distortion or chromatic aberrations introduced by the corresponding lenses 116, 118 of the HMD 102. As another example, the HMD 102 may experience significant rotation while the display frame is being generated by the display frame rendering component 604, and thus the final warp component 606 may work in concert with the display frame rendering component 604 to warp the display frame 608 as it is being generated to reflect any intra-frame rotation of the HMD 102 using the techniques described in U.S. Patent Application Ser. No. 62/174,602, entitled "Electronic Display Stabilization for Head Mounted Display" and filed on Jun. 12, 2015, the entirety of which is incorporated by reference herein. At block 708, the resulting warped display frame is displayed at the corresponding one of the displays 112, 114 via the corresponding display controller 228, 230. The process of blocks 704, 706, and 708 is performed in parallel for each eye, thereby generating a pair of warped display frames that are displayed in parallel so as to present a stereoscopic, or 3D, view of the 3D world from the perspective of the current pose of the HMD 102.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The preceding description is intended to convey a thorough understanding of the present disclosure by providing a number of specific embodiments and details involving 3D rendered graphics in user-portable display systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs. As such, the specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    maintaining a lightfield data structure representing at least a portion of a four-dimensional (4D) lightfield for a three-dimensional (3D) world in association with a first pose of a user-portable display device relative to the 3D world, by:
        determining a set of potential poses based on the first pose, the set of potential poses representing at least some of the poses that the user-portable display device is capable of taking within a specified time span by:
            determining a probability distribution of potential poses for the specified time span; and
            determining the set of potential poses from the probability distribution; and
        for each potential pose of the set of potential poses, rendering a lightfield frame representing a field of view of the 3D world from the potential pose and incorporating the lightfield frame into the lightfield data structure;
    determining a second pose of the user-portable display device relative to the 3D world based on the set of potential poses, the second pose comprising an updated pose of the user-portable display device;
    generating a display frame from the lightfield data structure based on the second pose, the display frame representing a field of view of the 3D world from the second pose; and
    displaying the generated display frame at the user-portable display device.

2. The method of claim 1, wherein: rendering wherein rendering the lightfield frame comprises:
    rendering the lightfield frame at a first rate; and
    rendering the display frame comprises rendering the display frame at a second rate greater than the first rate.

3. The method of claim 1, wherein:
    the user-portable display device comprises a head mounted display; and
    determining the probability distribution of potential poses comprises determining the probability distribution of potential poses further based on potential poses of a user's eyes for the specified time span.

4. The method of claim 1, wherein:
    generating the display frame from the lightfield data structure based on the second pose comprises generating the display frame based at least in part on ray-tracing-based interpolation from at least one rendered lightfield frame represented in the lightfield data structure.

5. The method of claim 1, wherein:
    the user-portable display device comprises a head mounted display having a left-eye display and a right-eye display; and
    generating the display frame from the lightfield data structure based on the second pose comprises:
        generating a first display frame for display on the left-eye display based on the second pose and an orientation of a left eye of the user relative to the second pose; and
        generating a second display frame for display on the right-eye display based on the second pose and an orientation of a right eye of the user relative to the second pose.

6. A user-portable display device comprising:
    a display;
    a storage component;
    an inertial sensor;
    an application processor coupled to the inertial sensor and the storage component, the application processor configured to:
        maintain, in the storage component, a lightfield data structure representing at least a portion of a four-dimensional (4D) lightfield of a three-dimensional (3D) world in association with one or more poses of the user-portable display device relative to the 3D world;
        determine a set of potential poses, the set of potential poses representing at least some of the poses that the user-portable display device is capable of taking within a specified time span by:
determining a probability distribution of potential poses for the specified time span; and
determining the set of potential poses from the probability distribution; and
for each potential pose of the set of poses, generate a lightfield frame representing a field of view of the 3D world from the respective potential pose and incorporating the lightfield frame into the lightfield data structure; and
a compositor coupled to the storage component and the inertial sensor, the compositor configured to:
determine a current pose of the user-portable display device relative to the 3D world based on output from the inertial sensor, the current pose comprising an updated pose of the user-portable display device; and
generate a display frame from the lightfield data structure based on the current pose, the display frame representing a field of view of the 3D world from the current pose, wherein the user-portable display device is configured to display the generated display frame.

7. The user-portable display device of claim 6, wherein the application processor is further configured to:
generate lightfield frames at a first rate; and
render display frames at a second rate different than the first rate.

8. The user-portable display device of claim 6, wherein:
the user-portable display device comprises a head mounted display; and
the application processor is further configured to determine the probability distribution of potential poses further based on potential poses of a user's eyes for the specified time span.

9. The user-portable display device of claim 6, wherein:
the application processor is further configured to generate the display frame based at least in part on ray-tracing-based interpolation from at least one rendered lightfield frame represented in the lightfield data structure.

10. The user-portable display device of claim 6, wherein:
the user-portable display device comprises a head mounted display having a left-eye display and a right-eye display; and
the application processor is further configured to:
generate a first display frame for display on the left-eye display based on the current pose and an orientation of a left eye of the user relative to the current pose; and
generate a second display frame for display on the right-eye display based on the current pose and an orientation of a right eye of the user relative to the current pose.

11. A head mounted display (HMD) system comprising:
a left-eye display and a right-eye display;
an inertial sensor; and
a processing system coupled to the left-eye display, right-eye display, and the inertial sensor, the processing system to:
determine a probability distribution of potential future poses of the HMD system based on a current pose of the HMD system;
within a specified time span, select a set of potential poses from the probability distribution;
render a set of lightfield frames based on the set of potential poses, each lightfield frame representing a view of a 3D world from a corresponding potential pose of the set;
determine an updated pose of the HMD system;
generate a first display frame for display at the left-eye display based on the set of lightfield frames and the updated pose; and
generate a second display frame for display at the right-eye display based on the set of lightfield frames and the updated pose.

12. The HMD system of claim 11, wherein:
the processing system is to generate the first display frame further based on an orientation of a left eye of a user; and
the processing system is to generate the second display frame further based on an orientation of a right eye of the user.

* * * * *